(12) United States Patent
Jeon et al.

(10) Patent No.: US 7,505,483 B2
(45) Date of Patent: Mar. 17, 2009

(54) APPARATUS FOR TRANSMITTING WPAN MAC FRAMES AND METHOD THEREOF

(75) Inventors: Yong Ae Jeon, Taejon (KR); Ji Eun Kim, Taejon (KR); Sangsung Choi, Taejon (KR)

(73) Assignee: Electronics and Telecommunications Research Institute, Taejeon (KR)

( * ) Notice: Subject to any disclaimer, the term of this patent is extended or adjusted under 35 U.S.C. 154(b) by 712 days.

(21) Appl. No.: 11/071,200

(22) Filed: Mar. 4, 2005

(65) Prior Publication Data

US 2006/0092844 A1    May 4, 2006

(30) Foreign Application Priority Data

Nov. 3, 2004    (KR) ..................... 10-2004-0088767

(51) Int. Cl.
*H04J 3/22* (2006.01)
(52) U.S. Cl. ...................................................... 370/469
(58) Field of Classification Search ................. 370/466, 370/469
See application file for complete search history.

(56) References Cited

U.S. PATENT DOCUMENTS

2002/0034172 A1* 3/2002 Ho .............................. 370/338
2004/0246993 A1* 12/2004 An .............................. 370/469

FOREIGN PATENT DOCUMENTS

| KR | 1020000014992 | 3/2000 |
| KR | 1020010038486 | 5/2001 |
| KR | 1020020049786 | 6/2002 |

* cited by examiner

*Primary Examiner*—Chirag G Shah
*Assistant Examiner*—Otis L Thompson, Jr.
(74) *Attorney, Agent, or Firm*—Lowe Hauptman Ham & Berner, LLP (57) ABSTRACT

An apparatus for transmitting WPAN (Wireless Personal Area Network) MAC (Medium Access Control) frames includes a transport frame management unit for creating MAC transport frames if data is generated from an upper protocol and application layer unit, classifying the created MAC transport frames by kinds, and managing the classified MAC transport frames by queues, a transport memory control unit for transmitting the transport frames at a high speed, and a transport frame transmission unit for responsible for the transmission of the transport frames by judging the transmission time of the frames.

19 Claims, 9 Drawing Sheets

| WORD | BITS | EXPLANATON | |
|---|---|---|---|
| 1 | 0 | VALID | — 300a |
|  | 1 | INTERRUPT | — 300b |
|  | 31~2 | FRAME_ADDRESS | — 300c |
| 2 | 15~0 | LENGTH | — 300d |
|  | 23~16 | RESERVED | — 300f |
|  | 31~24 | STREAM_INDEX | — 300e |

| WORD | BITS | EXPLANATON | |
|---|---|---|---|
| 1 | 0 | VALID | ~ 600a |
| | 31~2 | RESERVED | ~ 600d |
| 2 | 15~0 | LENGTH | ~ 600b |
| | 23~16 | RESERVED | ~ 600d |
| | 31~24 | STREAM_INDEX | ~ 600c |

| WORD | EXPLANATON | |
|---|---|---|
| 1 | DATA RATE FIELD | ~ 11 |
| 2 | LENGTH | ~ 12 |
| 3 | LENGTH | ~ 12 |
| 4~12 | MAC HEADER FIELD | ~ 13 |
| 13~14 | MORE MPDU FIELD | ~ 14 |
| 15~ | PAYLOAD FIELD | ~ 15 |

APPARATUS FOR TRANSMITTING WPAN MAC FRAMES AND METHOD THEREOF

BACKGROUND OF THE INVENTION

1. Field of the Invention

The present invention relates to an apparatus for transmitting WPAN (Wireless Personal Area Network) MAC (Medium Access Control) frames and a method thereof, and more particularly, to an apparatus for transmitting WPAN MAC frames and a method thereof which can support asynchronous streams and isochronous streams that satisfy the IEEE Standard 802.15.3, September 2003 (hereinafter referred to as "IEEE 802.15.3") in a WPAN environment.

2. Background of the Related Art

The WPAN MAC protocol has recently been recommended by the IEEE 802.15.3 MAC Committee as the standard for supporting asynchronous streams and isochronous streams by adopting a CSMA/CA (Carrier Sense Multiple Access/Collision Avoidance) system that considers the characteristic of a wireless medium unlike a CSMA/CD (Carrier Sense Multiple Access/Collision Detect) system used in the existing wire short-distance communication network and a TDMA (Time Division Multiple Access) system using a resource allocation algorithm.

Accordingly, the WPAN MAC frames should be stored in various corresponding transfer queues according to the traffic characteristic transferred from an upper layer, and different times and methods for the frame transmission should be applied to the frames according to respective transmission scheduling.

In order to transmit the WPAN MAC frames as described above, a MAC frame processing device for transferring the MAC frames according to the above-described characteristic between a WPAN MAC layer and a physical layer is required, and a static buffer operation method and a dynamic buffer operation method have been proposed as conventional technologies applicable to the WPAN.

The conventional static buffer operation method as described above operates buffers statically allocated by ports. Specifically, the conventional static buffer operation method allocates buffers by ports to a transport frame buffer, and sequentially reflects them in a transfer queue table to transmit the MAC frames. However, this method has the drawbacks in that since the respective ports are allocated for respective mobile terminals, many buffers are not in use but are wasted in the WPAN environment in which many mobile terminals exist.

Meanwhile, the conventional dynamic buffer operation method operates buffers dynamically allocated by ports. Specifically, the conventional dynamic buffer operation method allocates buffers to the transport frame buffer in the order of their reception, and stores them in the transfer queue table in order to transmit the MAC frames. In this case, the buffer waste can be reduced, but it is impossible to efficiently search for the frames of a specified mobile terminal.

Additionally, the above-described methods have the drawbacks in that since they store the frames in the unit of an MSDU (MAC Service Data Unit), it is impossible for them to process the frames in the unit of an MPDU (Mac Protocol Data Unit). Accordingly, they cannot support an efficient structure for a single MSDU process or an MSDU process composed of a set of MPDUs in order to support video/audio streams in the WPAN environment, and it is impossible to consider mutual collision problems caused by the memory access with the buffer waste reduced as well.

SUMMARY OF THE INVENTION

Accordingly, the present invention is directed to an apparatus for transmitting WPAN MAC frames and a method thereof that substantially obviate one or more problems due to limitations and disadvantages of the related art.

It is an object of the present invention to provide an apparatus for transmitting WPAN MAC frames and a method thereof that satisfy the IEEE 802.15.3 standard by designing a buffer and queue structure capable of transmitting WPAN MAC frames for supporting asynchronous streams and isochronous streams based on traffic characteristic information provided from an upper layer.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

In order to achieve the above and other objects, there is provided an apparatus for transmitting WPAN (Wireless Personal Area Network) MAC (Medium Access Control) frames, according to the present invention, which comprises a transport frame management unit for creating MAC transport frames through transport frames if the transport frames are generated from an upper protocol and application layer unit, classifying the created MAC transport frames by kinds, and managing the classified MAC transport frames by queues, a first-stage transport frame storage unit for storing the transport frames under the management of the transport frame management unit, a first-stage transport frame control information storage unit for storing storage information about the transport frames under the management of the transport frame management unit, a transport memory control unit for transmitting the transport frames stored in the first-stage transport frame storage unit at a high speed, a second-stage transport frame storage unit for storing the transport frames read and transferred from the first-stage transport frame storage unit by the transport memory control unit, a second-stage transport frame control information storage unit for storing storage information about the transport frames read and transferred from the first-stage transport frame control information storage unit by the transport memory control unit, and a transport frame transmission unit for grasping a position of the corresponding frame through the storage information in the second-stage transport frame control information storage unit if a transmission time of the transport frames is determined, reading and transmitting the transport frames stored in the second-stage transport frame storage unit to a physical layer unit.

In another aspect of the present invention, there is provided a method for transmitting WPAN (Wireless Personal Area Network) MAC (Medium Access Control) frames between an upper protocol and application layer unit and a physical layer unit, which comprises a $10^{th}$ step of creating transport frames as the MAC frames if the transport frames are generated from the upper protocol and application layer unit, a $20^{th}$ step of classifying and storing the MAC frames in a first-stage transport frame buffer area, a $30^{th}$ step of storing storage information about the transport frames stored in the transport frame buffer area in a first-stage transport frame control information buffer area, a $40^{th}$ step of transferring the MAC frames stored in the first-stage transport frame buffer area to a second-stage transport frame buffer area that can be accessed by a transport frame control device, a 50th step of transferring storage information stored in the first-stage transport frame control information buffer area to a second-stage transport frame control information buffer area that can be accessed by the transport frame control device, and a 60th step of transmitting the transport frames stored in the second-stage transport frame buffer area to the physical layer unit using the storage information stored in the second-stage transport frame control information buffer area if a frame transmission time is determined.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The preferred embodiment of the present invention will now be explained in detail with reference to the accompanying drawings.

Figure 1:
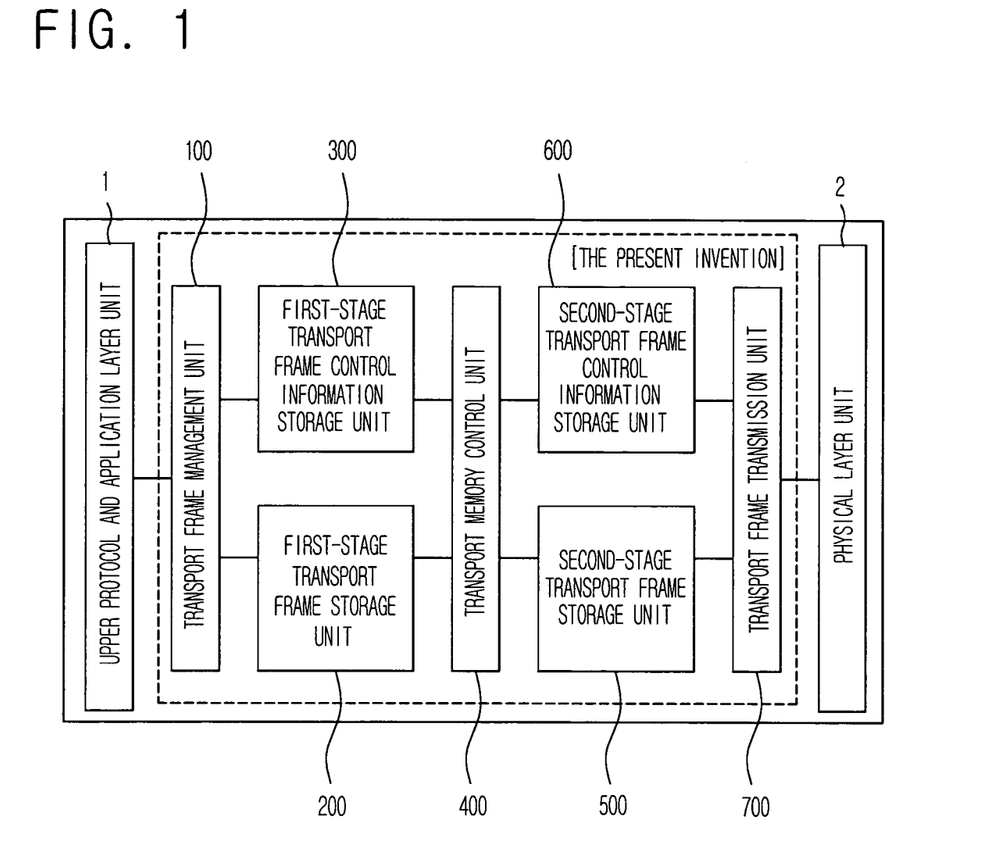
FIG. 1 is a block diagram illustrating the construction of a WPAN MAC frame transmission apparatus according to an embodiment of the present invention.

FIG. 1 is a block diagram illustrating the construction of a WPAN MAC frame transmission apparatus according to an embodiment of the present invention.

Referring to FIG. 1, the WPAN MAC frame transmission apparatus according to the present invention includes a transport frame management unit 100, a first-stage transport frame storage unit 200, a first-stage transport frame control information storage unit 300, a transport memory control unit 400, a second-stage transport frame storage unit 500, a second-stage transport frame control information storage unit 600 and a transport frame transmission unit 700.

Figure 2:
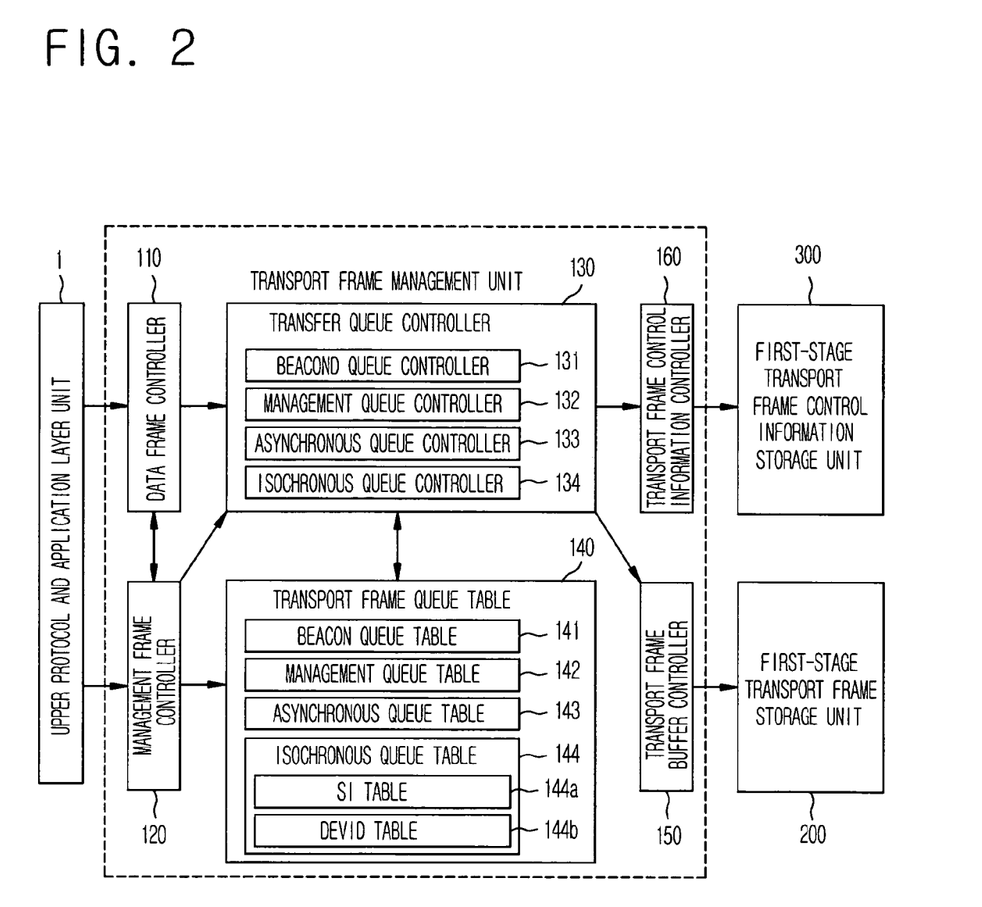
FIG. 2 is a block diagram illustrating the construction of a transport frame management unit in the WPAN MAC frame transmission apparatus of FIG. 1.

The transport frame management unit 100, if transport frames are generated from an upper protocol and application layer unit 1, serves to create MAC transport frames accordingly, classify the created MAC transport frames by kinds, and manage the classified MAC transport frames by queues. As illustrated in FIG. 2, the transport frame management unit 100 includes a data frame controller 110, a management frame controller 120, a transfer queue controller 130, a transport frame queue table 140, a transport frame buffer controller 150 and a transport frame control information controller 160.

The data frame controller 110 of the transport frame management unit 100, if the transport frames are generated from the upper protocol and application layer unit 1, creates the MAC transport frames accordingly, classifies the created MAC transport frames according to the traffic characteristic, and outputs the classified MAC transport frames to the transfer queue controller 140.

The management frame controller 120 of the transport frame management unit 100 creates management frames requested from the upper protocol and application layer unit 1 or required for the MAC protocol, and outputs the management frames to the transfer queue controller 130.

The transfer queue controller 130 of the transport frame management unit 100 receives the transport frames and the management frames from the data frame controller 110 and the management frame controller 120, respectively, stores and manages the transport frames and the management frames by kinds in the transport frame queue table 140. As illustrated in FIG. 2, the transfer queue controller 130 includes a beacon queue controller 131 for storing and managing beacon frames classified by the data frame controller 110 using the transport frame queue table 140, a management queue controller 132 for storing and managing the management frames created from the management frame controller 120 using the transport frame queue table 140, an asynchronous queue controller 133 for storing and managing asynchronous streams classified by the data frame controller 110 using the transport frame queue table 140, and an isochronous queue controller 134 for storing and managing isochronous streams classified by the data frame controller 110 using the transport frame queue table 140.

Meanwhile, the transport frame queue table 140 is a table for storing by kinds the transport frames classified by the data frame controller 110 and the management frames created through the management frame controller 120. As illustrated in FIG. 2, the transport frame queue table 140 includes a beacon queue table 141 for managing the beacon frames under the control of the transfer queue controller 130, a management queue table 142 for managing the management frames under the control of the transfer queue controller 130, an asynchronous queue table 143 for managing the asynchronous streams under the control of the transfer queue controller 130, and an isochronous queue table 144 for managing the isochronous streams under the control of the transfer queue controller 130. In this case, the isochronous queue table 144 includes an SI (Stream Index) table 144a for managing the isochronous streams by stream indexes, and a DEVID table 144b for classifying and managing the isochronous streams of the same stream index by destinations.

The transport frame buffer controller 150 of the transport frame management unit 100 serves to receive the transport frames from the transfer queue controller 130, store and manage the received frames in the first-stage transport frame storage unit 200. The transport frame control information controller 160 serves to receive the storage information about the transport frames from the transfer queue controller 130, store and manage the received storage information about the transport frames in the first-stage transport frame control information storage unit 300.

The first-stage transport frame storage unit 200 is a buffer area in which the transport frames are stored under the management of the transport frame management unit 100.

Figure 3:
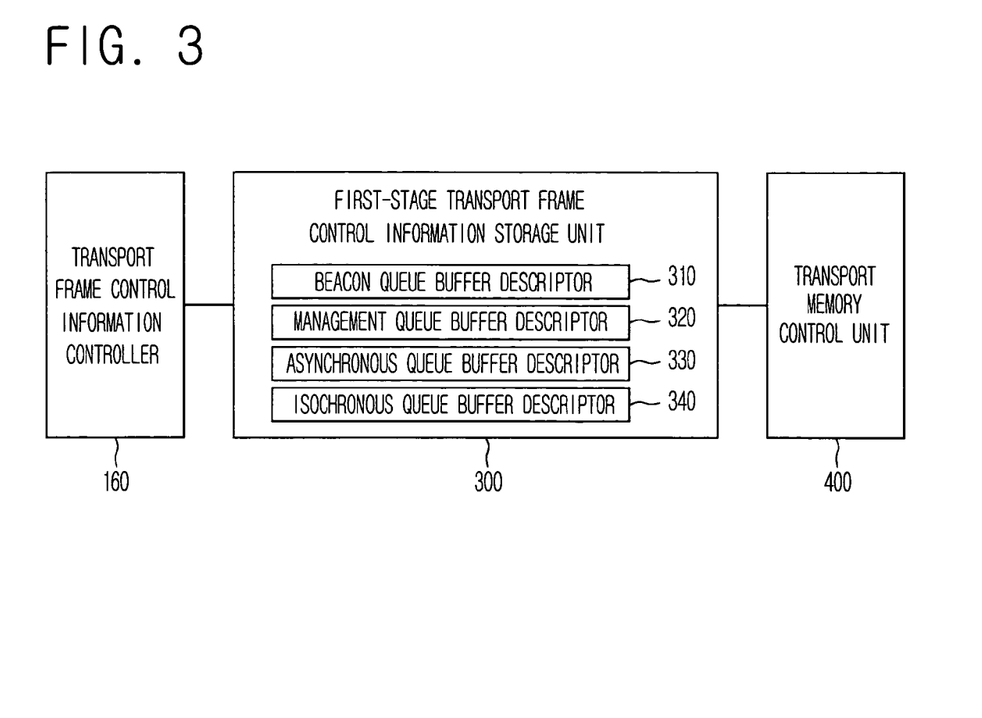
FIG. 3 is a block diagram illustrating the construction of a first-stage transport frame control information storage unit in the WPAN MAC frame transmission apparatus of FIG. 1.
Figure 4:
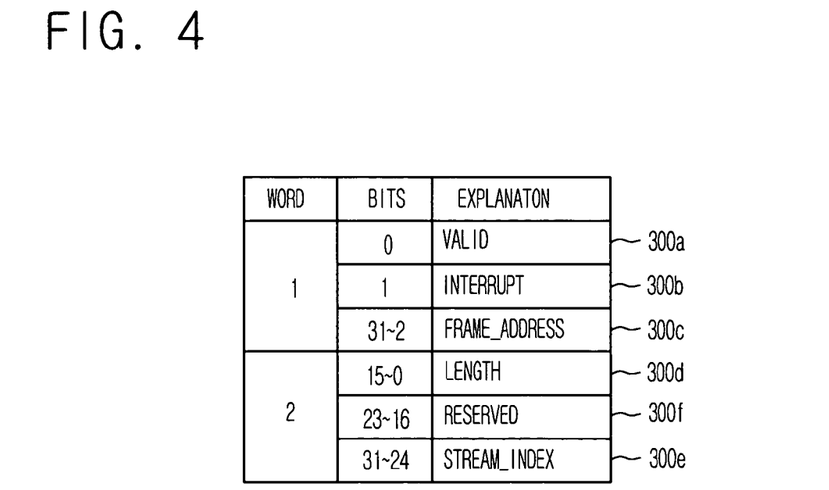
FIG. 4 is a view illustrating the structure of a buffer descriptor of the first-stage transport frame control information storage unit in the WPAN MAC frame transmission apparatus of FIG. 3.

Meanwhile, the first-stage transport frame control information storage unit 300 is a buffer area in which the storage information about the transport frames is stored under the management of the transport frame management unit 100. As illustrated in FIG. 3, the first-stage transport frame control information storage unit 300 includes a beacon queue buffer descriptor 310 for receiving and storing the storage information about the beacon frames from the transport frame management unit 100, a management queue buffer descriptor 320 for receiving and storing the storage information about the management frames from the transport frame management unit 100, an asynchronous queue buffer descriptor 330 for receiving and storing the storage information about the asynchronous streams from the transport frame management unit 100, and an isochronous queue buffer descriptor 340 for receiving and storing the storage information about the isochronous streams from the transport frame management unit 100. In this case, the buffer descriptors 310 to 340 of the first-stage transport frame control information storage unit 300 have a size of 8 bytes. Specifically, as illustrated in FIG. 4, the buffer descriptor includes a validity bit 300a for indicating the validity of data, an interrupt bit 300b for indicating whether an interrupt is reported after the transmission of the transport frames to the transport frame management unit 100 is completed, a frame address field 300c for indicating a first-stage storage position of the transport frames, a length field 300d for indicating length information of the transport frame, a stream index field 300e for discriminating streams of the transport frames, and a reserved field 300f that is a reserved space.

Meanwhile, the transport memory control unit 400, in order to transmit the transport frames stored in the first-stage transport frame storage unit 200 at a high speed, moves and stores the transport frames from the first-stage transport frame storage unit 200 to the second-stage transport frame storage unit 500, and stores the storage information about the transport frames stored in the second-stage transport frame storage unit 500 in the second-stage transport frame control information storage unit 600.

Additionally, the second-stage transport frame storage unit 500 is a buffer area in which the transport frames read and moved from the first-stage transport frame storage unit 200 by the transport memory control unit 400 are stored.

Figure 5:
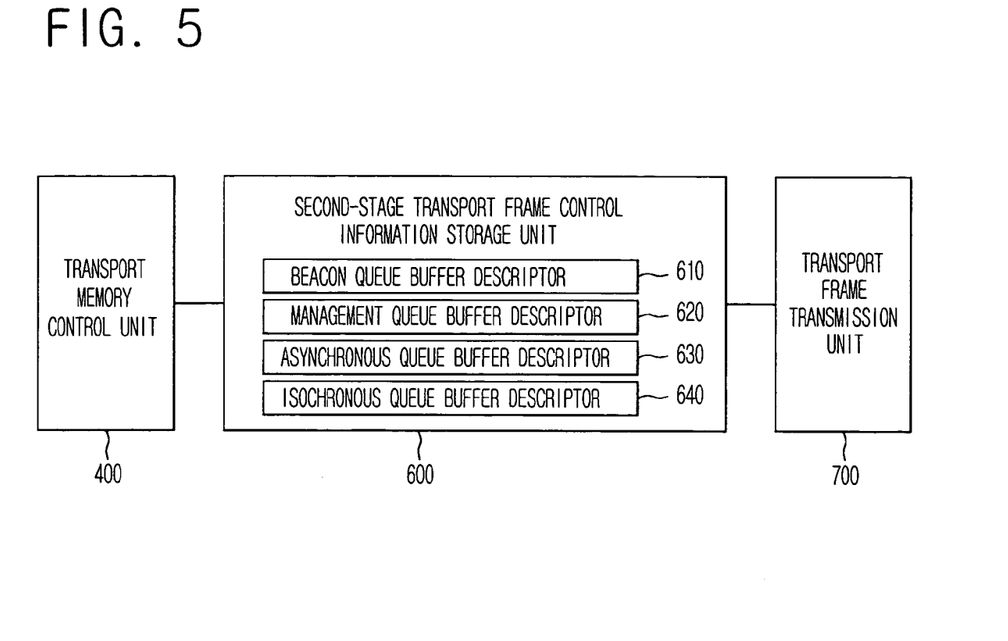
FIG. 5 is a block diagram illustrating the construction of a second-stage transport frame control information storage unit in the WPAN MAC frame transmission apparatus of FIG. 1.
Figure 6:
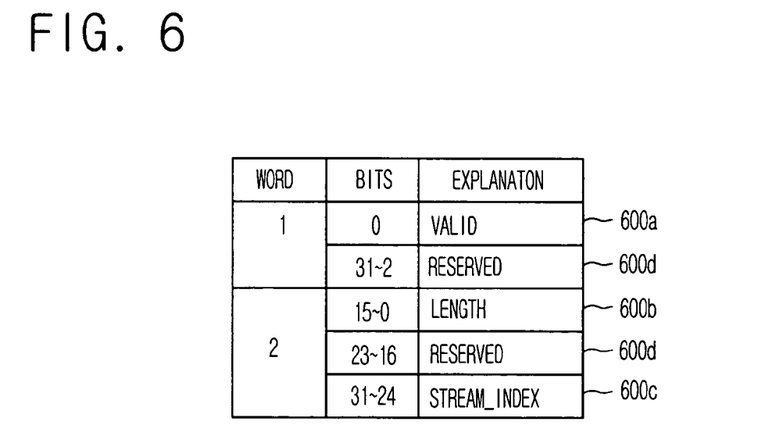
FIG. 6 is a view illustrating the structure of a buffer descriptor of the second-stage transport frame control information storage unit in the WPAN MAC frame transmission apparatus of FIG. 1.

Meanwhile, the second-stage transport frame control information storage unit 600 is a buffer area in which the storage information about the transport frames read and moved from the first-stage transport frame control information storage unit 300 by the transport memory control unit 400 is stored. As illustrated in FIG. 5, the second-stage transport frame control information storage unit 600 includes a beacon queue buffer descriptor 610 for receiving and storing the storage information about the beacon frames from the transport memory control unit 400, a management queue buffer descriptor 620 for receiving and storing the storage information about the management frames from the transport memory control unit 400, an asynchronous queue buffer descriptor 630 for receiving and storing the storage information about the asynchronous streams from the transport memory control unit 400, and an isochronous queue buffer descriptor 640 for receiving and storing the storage information about the isochronous streams from the transport memory control unit 400. In this case, the buffer descriptors 610 to 640 of the second-stage transport frame control information storage unit 600 have a size of 8 bytes. Specifically, as illustrated in FIG. 6, the buffer descriptor includes a validity bit 600a for indicating the validity of data, a length field 600b for indicating length information of the transport frame, a stream index field 600c for discriminating streams of the transport frames, and a reserved field 600d that is a reserved space.

Figure 7:
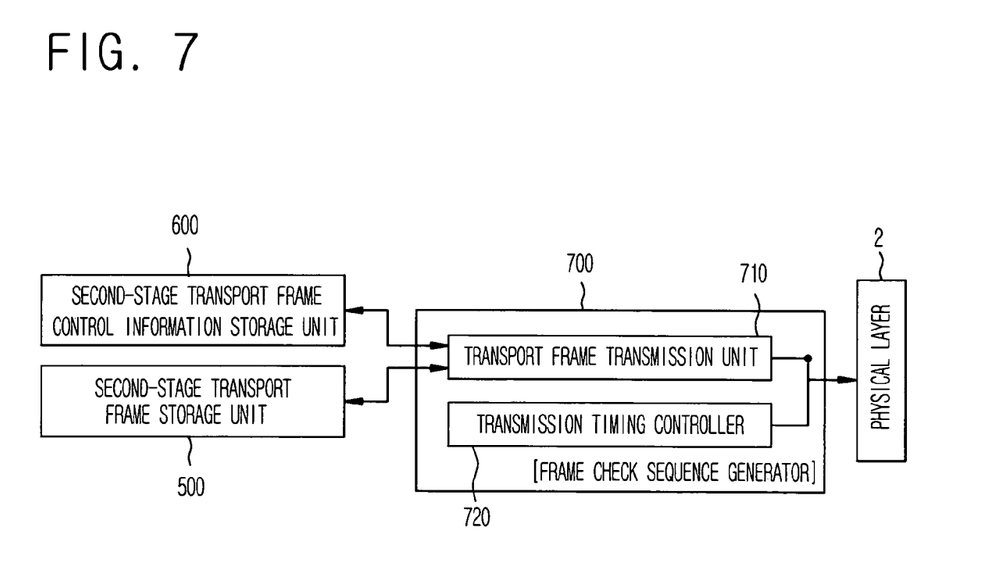
FIG. 7 is a block diagram illustrating the construction of a transport frame transmission unit in the WPAN MAC frame transmission apparatus of FIG. 1.

The transport frame transmission unit 700, if the transmission time of the transport frame is determined, grasps a position of the corresponding frame through the storage information stored in the second-stage transport frame control information storage unit 600, reads and transmits the transport frame stored in the second-stage transport frame storage unit 500 to the physical layer unit 2. As illustrated in FIG. 7, the transport frame transmission unit 700 includes a transmission timing controller 710 for grasping the position of the corresponding frame using the information of the second-stage transport frame control information storage unit 600 if the transmission time of the specified transport frame is determined, reading and transmitting the corresponding transport frame stored in the second-stage transport frame storage unit 500 to the physical layer unit 2, and a frame check sequence generator 720 for creating a frame check sequence (FCS) to be added when the transmission timing controller 710 transmits the transport frame, and transmitting the FCS to the physical layer unit 2.

Figure 8:
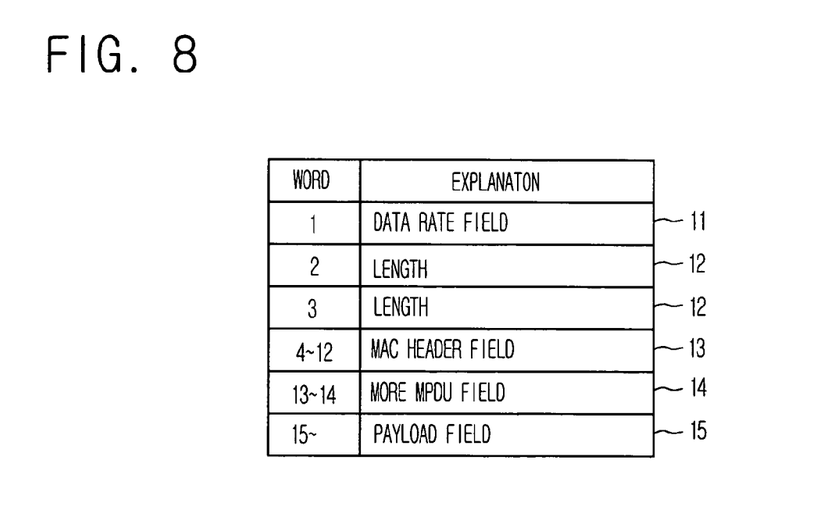
FIG. 8 is a view illustrating the structure of a transport frame in the WPAN MAC frame transmission apparatus of FIG. 1.

Meanwhile, the transport frame 10 as described above, as illustrated in FIG. 8, includes a data rate field 11 for providing data rate information to the physical layer unit 2, a payload length field 12 for providing payload length information of the transport frame to the physical layer unit 2, a MAC header field 13 for indicating header information of the MAC frame, a divided frame existence/non-existence field 14 including a "More_MPDU" bit for indicating existence/non-existence of the divided frame if the transport frame is divided and transmitted, and a payload field 15 for indicating data information of the transport frame.

Hereinafter, the structure of a beacon queue to be proposed according to the present invention will be explained in detail with reference to the accompanying drawings.

Figure 9:
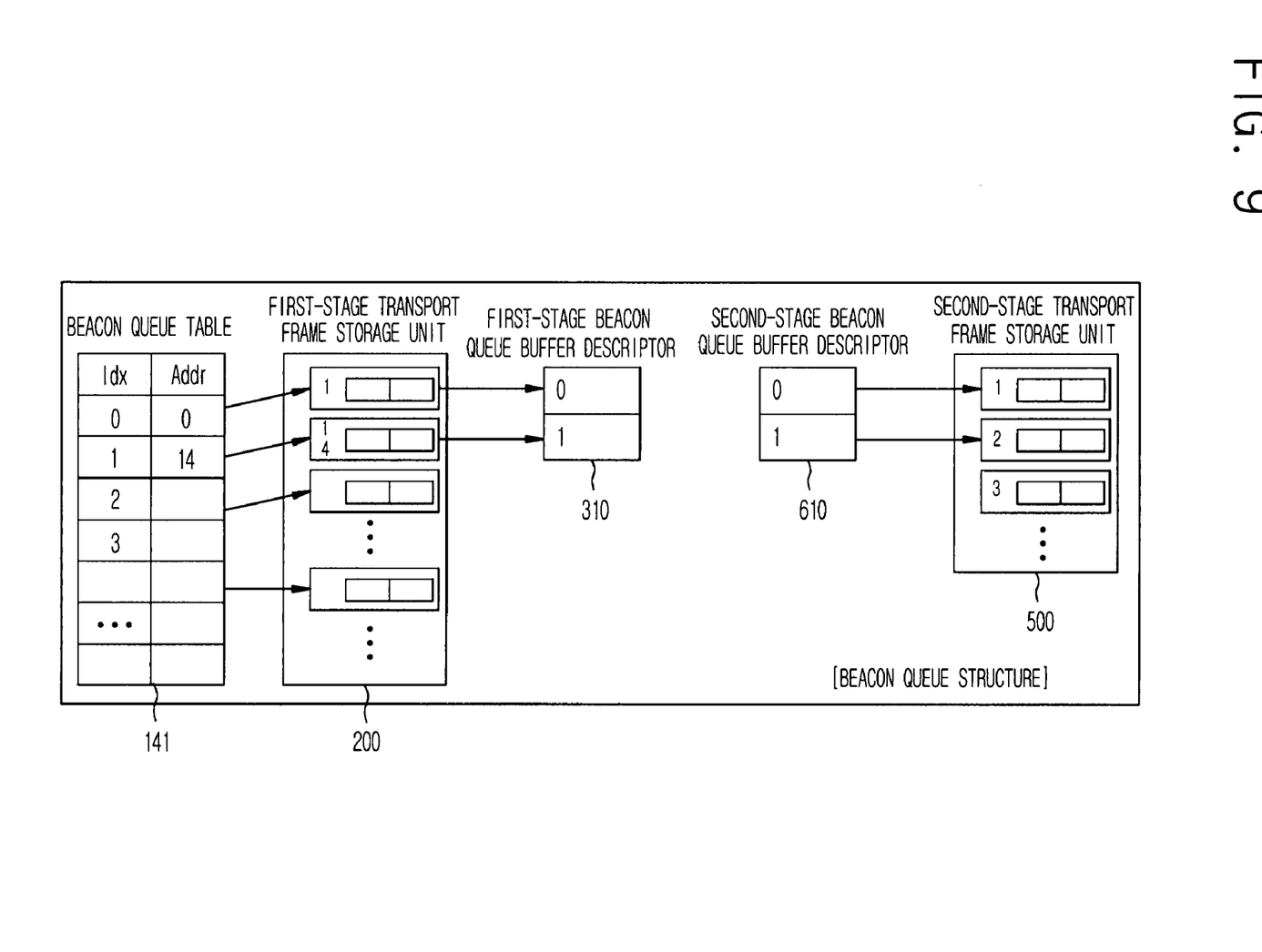
FIG. 9 is a view explaining the structure of a transfer beacon queue in the WPAN MAC frame transmission apparatus according to an embodiment of the present invention.

FIG. 9 is a view explaining the structure of a transfer beacon queue in the WPAN MAC frame transmission apparatus according to an embodiment of the present invention.

The transfer beacon queue includes the beacon queue table 141 for managing the beacon frames, the first-stage transport frame storage unit 200 for primarily storing the actual transfer beacon frames under the control of the transport frame management unit 100, the first-stage beacon queue buffer descriptor 310 composed of information stored in the first-stage transport frame control information storage unit 300, the second-stage transport frame storage unit 500 for storing the transport frame transmission unit 700 as an accessible area under the control of the transport memory control unit 400, and the second-stage beacon queue buffer descriptor 610 composed of information stored in the second-stage transport frame control information storage unit 600.

Figure 10:
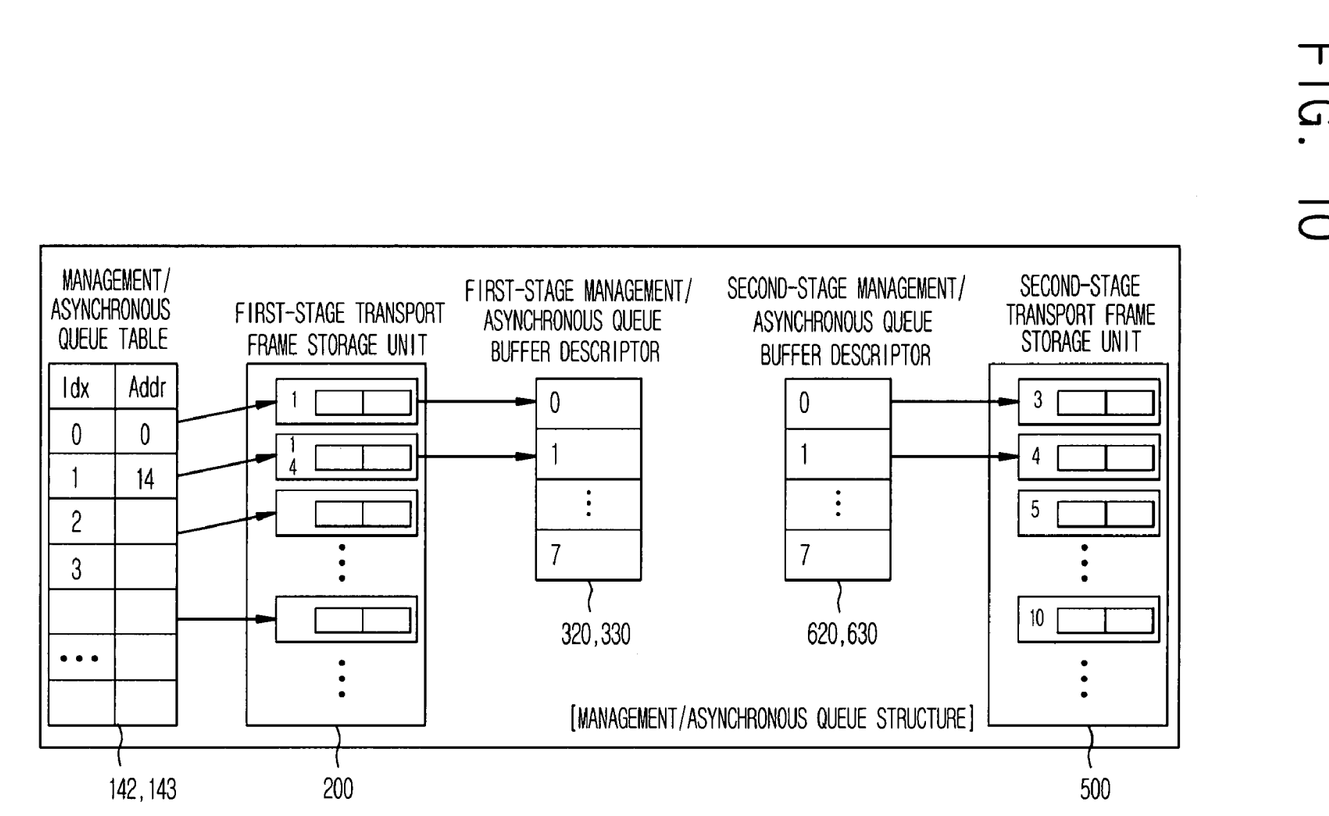
FIG. 10 is a view explaining the structure of a transmission management and asynchronous queue in the WPAN MAC frame transmission apparatus according to an embodiment of the present invention.

FIG. 10 is a view explaining the structure of a transmission management and asynchronous queue in the WPAN MAC frame transmission apparatus according to an embodiment of the present invention.

The management/asynchronous queue includes the management/asynchronous queue tables 142 and 143 for managing the asynchronous frames by destination addresses, the first-stage transport frame storage unit 200 for primarily storing the actual asynchronous transport frames under the control of the transport frame management unit 100, the first-stage management/asynchronous queue buffer descriptors 320 and 330 composed of information stored in the first-stage transport frame control information storage unit 300, the second-stage transport frame storage unit 500 for storing the transport frame transmission unit 700 as an accessible area under the control of the transport memory control unit 400, and the second-stage management/asynchronous queue buffer descriptors 620 and 630 composed of information stored in the second-stage transport frame control information storage unit 600.

Figure 11:
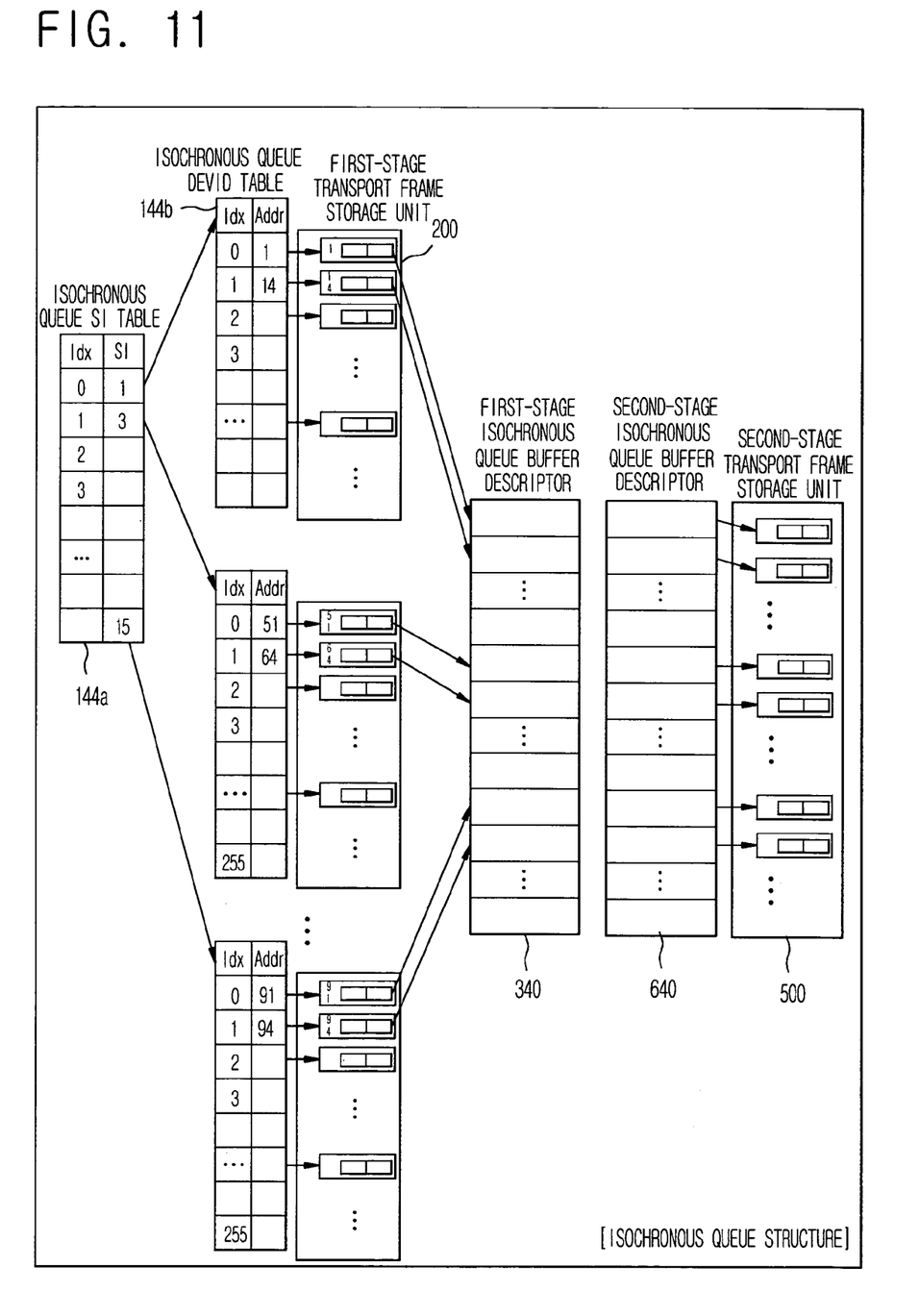
FIG. 11 is a view explaining the structure of a transfer isochonous queue in the WPAN MAC frame transmission apparatus according to an embodiment of the present invention.

FIG. 11 is a view explaining the structure of a transfer isochonous queue in the WPAN MAC frame transmission apparatus according to an embodiment of the present invention.

The transfer isochronous queue includes the transfer isochronous queue SI (Stream Index) table 144a for managing the isochronous steams by stream indexes, the isochronous queue DEVID table 144b for managing the isochronous streams of the same stream index by destinations, the first-stage transport frame storage unit 200 for primarily storing the actual isochronous transport frames under the control of the transport frame management unit 100, the first-stage isochronous queue buffer descriptor 340 composed of information stored in the first-stage transport frame control information storage unit 300, the second-stage transport frame storage unit 500 for storing the transport frame transmission unit 700 as an accessible area under the control of the transport memory control unit 400, and the second-stage isochronous queue buffer descriptor 640 composed of information stored in the second-stage transport frame control information storage unit 600.

Figure 12:
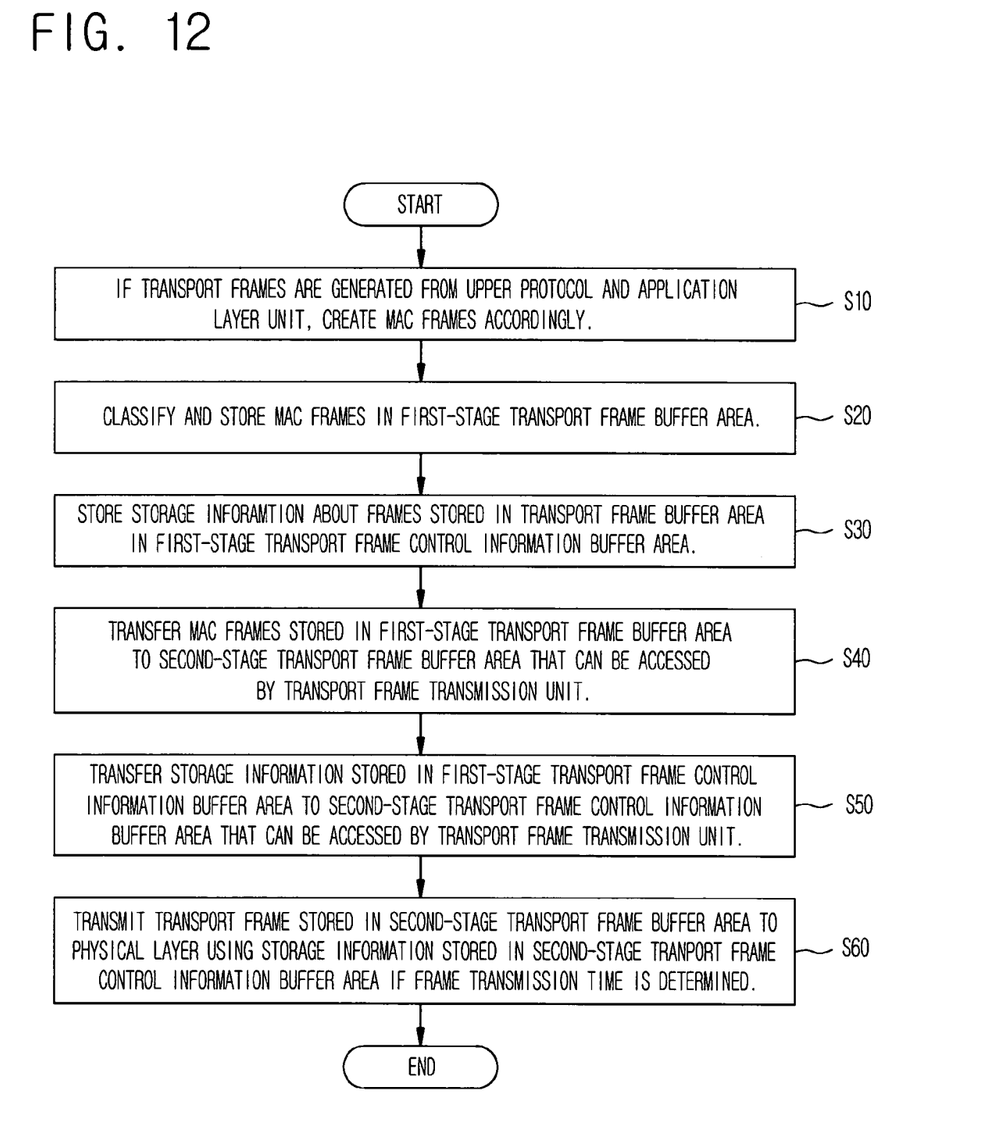
FIG. 12 is a flowchart illustrating a WPAN MAC frame transmission method according to an embodiment of the present invention.

Now, a WPAN MAC frame transmission method using the apparatus as constructed above according to the present invention will be explained with reference to FIG. 12.

The transport frame management unit 100, if the transport frames are generated from the upper protocol and application layer unit 1, creates the MAC transport frames accordingly (step S10). Then, the transport frame management unit 100 classifies the created MAC transport frames, and stores the classified MAC transport frames in the first-stage transport frame storage unit 200 (step S20). In this case, the MAC frame is classified into a beacon frame, a management frame, an asynchronous stream and an isochronous stream at step S20. Then, the transport frame management unit 100 stores the storage information about the frames stored in the first-stage transport frame storage unit 200 in the first-stage transport frame control information storage unit 300 (step S30).

Now, the steps S10 to S30 performed by the transport frame management unit 100 will be explained in more detail. If the WPAN MAC frame transmission apparatus according to the present invention is initialized with PNC or DEV of the WPAN and is ready to perform a normal operation, it prepares for the reception of the data transmission request from the upper protocol and application layer unit 1.

That is, in the case of the PNC, the management frame controller 120 creates the beacon frames according to the protocol procedure, makes the beacon queue controller 131 store the created beacon frames in a specified position of the first-stage transport frame storage unit 200 using the transport frame buffer controller 150, and constructs the beacon queue table 141 through the above storage information. Additionally, the beacon queue controller 131 controls the transport frame control information controller 160 to reflect the information stored in the first-stage transport frame control information storage unit 300 in the first-stage transport frame control information storage unit 300, so that the transport memory control unit 400 can use the information.

Meanwhile, in the case of the DEV, the management frame controller 120 creates the management frames for proceeding to belong to a specified piconet using the collected beacon frame information according to the protocol procedure, so that the transport memory control unit 400 can use the transport frame control information storage unit 300 under the control of the management queue controller 132 in the same manner as the beacon queue process.

If the apparatus is ready to receive the data transmission request from the upper protocol and application layer unit 1 through the above-described procedure, the transport frame management unit 100 creates the asynchronous frames or the isochronous frames through the data frame controller 110 according to the traffic characteristic, so that the transport memory control unit 400 can use the created frames in the similar manner to the above-described beacon frame process.

Meanwhile, after the step S30, the transport memory control unit 400 transfers the MAC frames stored in the first-stage transport frame storage unit 200 to the second-stage transport frame storage unit 500 that can be accessed by the transport frame transmission unit 700 (step S40), and then transfers the storage information stored in the first-stage transport frame control information storage unit 300 to the second-stage transport frame control information storage unit 600 that can be accessed by the transport frame transmission unit 700 (step S50).

The transport frame transmission unit 700, if the frame transmission time is determined, grasps the position of the transport frames using the storage information stored in the second-stage transport frame control information storage unit, reads and transmits the transport frames stored in the second-stage transport frame storage unit 500 to the physical layer unit 2 (step S60).

In this case, the WPAN MAC frame transmission method according to the present invention can be produced as a computer program and stored in a recording medium such as a hard disc, a floppy disc, an optomagnetic disc, a CD ROM, a flash memory, a ROM, a RAM, etc.

From the foregoing, it will be apparent that the apparatus for transmitting WPAN MAC frames the method thereof according to the present invention has the prominent effects that it can efficiently support the IEEE 802.15.3 standard by designing a queue structure capable of managing the WPAN MAC frames according to the user's priority information and the traffic characteristic in the WPAN device for supporting video/audio streams.

While the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. An apparatus for transmitting WPAN (Wireless Personal Area Network) MAC (Medium Access Control) frames, comprising:

a transport frame management unit for
creating MAC transport frames through transport frames if the transport frames are generated from an upper protocol and application layer unit,
classifying, by kinds, the created MAC transport frames in a MAC layer, and
managing the classified MAC transport frames by queues, wherein said kinds comprise beacon frames, asynchronous streams and isochronous streams;
a first-stage transport frame storage unit for storing the transport frames under the management of the transport frame management unit;
a first-stage transport frame control information storage unit for storing storage information about the transport frames under the management of the transport frame management unit;
a transport memory control unit for transmitting the transport frames stored in the first-stage transport frame storage unit at a high speed;
a second-stage transport frame storage unit for storing the transport frames read and transferred from the first-stage transport frame storage unit by the transport memory control unit;
a second-stage transport frame control information storage unit for storing storage information about the transport frames read and transferred from the first-stage transport frame control information storage unit by the transport memory control unit; and
a transport frame transmission unit for grasping a position of the corresponding frame through the storage information stored in the second-stage transport frame control information storage unit if a transmission time of the transport frames is determined, reading and transmitting the transport frames stored in the second-stage transport frame storage unit to a physical layer unit.

2. An apparatus for transmitting WPAN (Wireless Personal Area Network) MAC (Medium Access Control) frames, said apparatus comprising:

a transport frame management unit for creating MAC transport frames though transport frames if the transport frames are generated from an upper protocol and application layer unit, classifying the created MAC transport frames by kinds, and managing the classified MAC transport frames by queues;
a first-stage transport frame storage unit for storing the transport frames under the management of the transport frame management unit;
a first-stage transport frame control information storage unit for storing storage information about the transport frames under the management of the transport frame management unit;
a transport memory control unit for transmitting the transport frames stored in the first-stage transport frame storage unit at a high speed;
a second-stage transport frame storage unit for storing the transport frames read and transferred from the first-stage transport frame storage unit by the transport memory control unit;
a second-stage transport frame control information storage unit for storing storage information about the transport frames read and transferred from the first-stage transport frame control information storage unit by the transport memory control unit; and
a transport frame transmission unit for grasping a position of the corresponding frame though the storage information stored in the second-stage transport frame control information storage unit if a transmission time of the transport frames is determined, reading and transmitting the transport frames stored in the second-stage transport frame storage unit to a physical layer unit;
wherein the transport frame management unit comprises:
a data frame controller for creating the MAC transport frames, classifying the created MAC transport frames according to a traffic characteristic, and managing the classified MAC transport frames;
a management frame controller for creating management frames requested from the upper protocol and application layer unit or required for a MAC protocol;
a transfer queue controller for receiving the transport frames and the management frames from the data frame controller and the management frame controller, respectively, storing and managing the transport frames and the management frames by kinds;
a transport frame queue table for storing by kinds the transport frames and the management frames under the control of the transfer queue controller;
a transport frame buffer controller for receiving the transport frames from the transfer queue controller, storing and managing the transport frames in the first-stage transport frame storage unit; and
a transport frame control information controller for receiving the storage information of the transport frames from the transfer queue controller, storing and managing the storage information in the first-stage transport frame control information storage unit.

3. The apparatus as claimed in claim 2, wherein the transfer queue controller comprises:

a beacon queue controller for storing and managing beacon frames classified by the data frame controller using the transport frame queue table;
a management queue controller for storing and managing the management frames created through the management frame controller using the transport frame queue table;
an asynchronous queue controller for storing and managing asynchronous streams classified by the data frame controller using the transport frame queue table; and
an isochronous queue controller for storing and managing isochronous streams classified by the data frame controller using the transport frame queue table.

4. The apparatus as claimed in claim 2, wherein the transport frame queue table comprises:

a beacon queue table for managing the beacon frames according to the traffic characteristic and user's priority information under the control of the transfer queue controller;
a management queue table for managing the management frames under the control of the transfer queue controller;
an asynchronous queue table for managing the asynchronous streams under the control of the transfer queue controller; and an isochronous queue table for managing the isochronous streams under the control of the transfer queue controller.

5. The apparatus as claimed in claim 4, wherein the isochronous queue table comprises:
an SI (Stream Index) table for managing the isochronous streams by stream indexes; and
a DEVID table for classifying and managing the isochronous streams of the same stream index by destinations.

6. The apparatus as claimed in claim 1, wherein the first-stage transport frame control information storage unit comprises:
a beacon queue buffer descriptor for receiving and storing the storage information about the beacon frames from the transport frame management unit;
a management queue buffer descriptor for receiving and storing the storage information about management frames from the transport frame management unit;
an asynchronous queue buffer descriptor for receiving and storing the storage information about the asynchronous streams from the transport frame management unit; and
an isochronous queue buffer descriptor for receiving and storing the storage information about the isochronous streams from the transport frame management unit.

7. An apparatus for transmitting WPAN (Wireless Personal Area Network) MAC (Medium Access Control) frames, said apparatus comprising:
a transport frame management unit for creating MAC transport frames though transport frames if the transport frames are generated from an upper protocol and application layer unit, classifying the created MAC transport frames by kinds, and managing the classified MAC transport frames by queues;
a first-stage transport frame storage unit for storing the transport frames under the management of the transport frame management unit;
a first-stage transport frame control information storage unit for storing storage information about the transport frames under the management of the transport frame management unit;
a transport memory control unit for transmitting the transport frames stored in the first-stage transport frame storage unit at a high speed;
a second-stage transport frame storage unit for storing the transport frames read and transferred from the first-stage transport frame storage unit by the transport memory control unit;
a second-stage transport frame control information storage unit for storing storage information about the transport frames read and transferred from the first-stage transport frame control information storage unit by the transport memory control unit; and
a transport frame transmission unit for grasping a position of the corresponding frame though the storage information stored in the second-stage transport frame control information storage unit if a transmission time of the transport frames is determined, reading and transmitting the transport frames stored in the second-stage transport frame storage unit to a physical layer unit;
wherein the first-stage transport frame control information storage unit comprises:
a beacon queue buffer descriptor for receiving and storing the storage information about the beacon frames from the transport frame management unit;
a management queue buffer descriptor for receiving and storing the storage information about the management frames from the transport frame management unit;
an asynchronous queue buffer descriptor for receiving and storing the storage information about the asynchronous streams from the transport frame management unit; and
an isochronous queue buffer descriptor for receiving and storing the storage information about the isochronous streams from the transport frame management unit; and
wherein the buffer descriptor of the first-stage transport frame control information storage unit comprises:
a validity bit for indicating validity of data;
an interrupt bit for indicating whether an interrupt is reported after the transmission of the transport frames to the transport frame management unit is completed;
a frame address field for indicating a first-stage storage position of the transport frames;
a length field for indicating length information of the transport frame;
a stream index field for discriminating streams of the transport frames; and
a reserved field that is a reserved space.

8. The apparatus as claimed in claim 7, wherein the buffer descriptor of the first-stage transport frame control information storage unit has a size of 8 bytes.

9. The apparatus as claimed in claim 1, wherein the second-stage transport frame control information storage unit comprises:
a beacon queue buffer descriptor for receiving and storing the storage information about the beacon frames from the transport memory control unit;
a management queue buffer descriptor for receiving and storing the storage information about management frames from the transport memory control unit;
an asynchronous queue buffer descriptor for receiving and storing the storage information about the asynchronous streams from the transport memory control unit; and
an isochronous queue buffer descriptor for receiving and storing the storage information about the isochronous streams from the transport memory control unit.

10. The apparatus as claimed in claim 9, wherein the buffer descriptor of the second-stage transport frame control information storage unit comprises:
a validity bit for indicating validity of data;
a length field for indicating length information of the transport frame;
a stream index field for discriminating streams of the transport frames; and
a reserved field that is a reserved space.

11. The apparatus as claimed in claim 10, wherein the buffer descriptor of the second-stage transport frame control information storage unit has a size of 8 bytes.

12. The apparatus as claimed in claim 1, wherein the transport frame transmission unit comprises:
a transmission timing controller for grasping the position of the corresponding frame using the information of the second-stage transport frame control information storage unit if a transmission time of the specified transport frame is determined, reading and transmitting the corresponding transport frame stored in the second-stage transport frame storage unit to the physical layer unit; and
a frame check sequence generator for creating a frame check sequence (FCS) to be added when the transmission timing controller transmits the transport frame, and transmitting the FCS to the physical layer unit.

13. The apparatus as claimed in claim 1, wherein the transport frame comprises:
a data rate field for providing data rate information to the physical layer unit;
a payload length field for providing payload length information of the transport frame to the physical layer unit;

a MAC header field for indicating header information of the MAC frame;

a divided frame existence/non-existence field including a "More_MPDU" bit for indicating an existence/non-existence of the divided frame if the transport frame is divided and transmitted; and a payload field for indicating data information of the transport frame.

14. A method for transmitting WPAN (Wireless Personal Area Network) MAC (Medium Access Control) frames between an upper protocol and application layer unit and a physical layer unit, the method comprising:

creating transport frames as the MAC frames if the transport frames are generated from the upper protocol and application layer unit;

classifying, in a MAC layer, the MAC frames by kinds, said kinds comprising beacon frames, asynchronous streams and isochronous streams;

storing the MAC frames in a first-stage transport frame buffer area;

storing storage information about the transport frames, which are stored in the first-stage transport frame buffer area, in a first-stage transport frame control information buffer area;

transferring the MAC frames stored in the first-stage transport frame buffer area to a second-stage transport frame buffer area that can be accessed by a transport frame control device;

transferring storage information stored in the first-stage transport frame control information buffer area to a second-stage transport frame control information buffer area that can be accessed by the transport frame control device; and transmitting the transport frames stored in the second-stage transport frame buffer area to the physical layer unit using the storage information stored in the second-stage transport frame control information buffer area if a frame transmission time is determined.

15. The method as claimed in claim 14, wherein the transport frame comprises:

a data rate field for providing data rate information to the physical layer unit;

a payload length field for providing payload length information of the transport frame to the physical layer unit;

a MAC header field for indicating header information of the MAC frame;

a divided frame existence/non-existence field including a "More_MPDU" bit for indicating an existence/non-existence of the divided frame if the transport frame is divided and transmitted; and a payload field for indicating data information of the transport frame.

16. The apparatus as claimed in claim 1, wherein the transport frame management unit comprises:

a data frame controller for creating the MAC transport frames, and classifying the created MAC transport frames according to said kinds; and a management frame controller for creating management frames requested from the upper protocol and application layer unit or required for a MAC protocol.

17. The apparatus as claimed in claim 16, further comprising a transfer beacon queue which comprises in the recited order:

a beacon queue table in the transport frame management unit for managing the beacon frames, the first-stage transport frame storage unit for storing the beacon frames to be transferred under the control of the transport frame management unit, a first-stage beacon queue buffer descriptor in the first-stage transport frame control information storage unit for storing the storage information about the beacon frames to be transferred;

a second-stage beacon queue buffer descriptor in the second-stage transport frame control information storage unit for storing the storage information about the beacon frames transferred from the first-stage transport frame control information storage unit via the transport memory control unit; and the second-stage transport frame storage unit for storing the beacon frames transferred from the first-stage transport frame storage unit via the transport memory control unit in an area accessible by the transport frame transmission unit.

18. The apparatus as claimed in claim 16, further comprising a transmission management and asynchronous queue which comprises in the recited order:

management/asynchronous queue tables in the transport frame management unit for managing the asynchronous frames by destination addresses, the first-stage transport frame storage unit for storing asynchronous transport frames to be transferred under the control of the transport frame management unit, first-stage management/asynchronous queue buffer descriptors in the first-stage transport frame control information storage unit for storing the storage information about the asynchronous transport frames to be transferred;

second-stage management/asynchronous queue buffer descriptors in the second-stage transport frame control information storage unit for storing the storage information about the asynchronous transport frames transferred from the first-stage transport frame control information storage unit via the transport memory control unit; and the second-stage transport frame storage unit for storing the asynchronous transport frames transferred from the first-stage transport frame storage unit via the transport memory control unit in an area accessible by the transport frame transmission unit.

19. The apparatus as claimed in claim 16, further comprising a transfer isochronous queue which comprises in the recited order:

a transfer isochronous queue SI (Stream Index) table in the transport frame management unit for managing the isochronous steams by stream indexes, and an isochronous queue DEVID table in the transport frame management unit for managing the isochronous streams of the same stream index by destinations, the first-stage transport frame storage unit for storing the isochronous transport frames to be transferred under the control of the transport frame management unit, a first-stage isochronous queue buffer descriptor in the first-stage transport frame control information storage unit for storing the storage information about the isochronous transport frames to be transferred;

a second-stage isochronous queue buffer descriptor in the second-stage transport frame control information storage unit for storing the storage information about the isochronous transport frames transferred from the first-stage transport frame control information storage unit via the transport memory control unit; and the second-stage transport frame storage unit for storing the isochronous transport frames transferred from the first-stage transport frame storage unit via the transport memory control unit in an area accessible by the transport frame transmission unit.

* * * * *